Patented Apr. 14, 1942

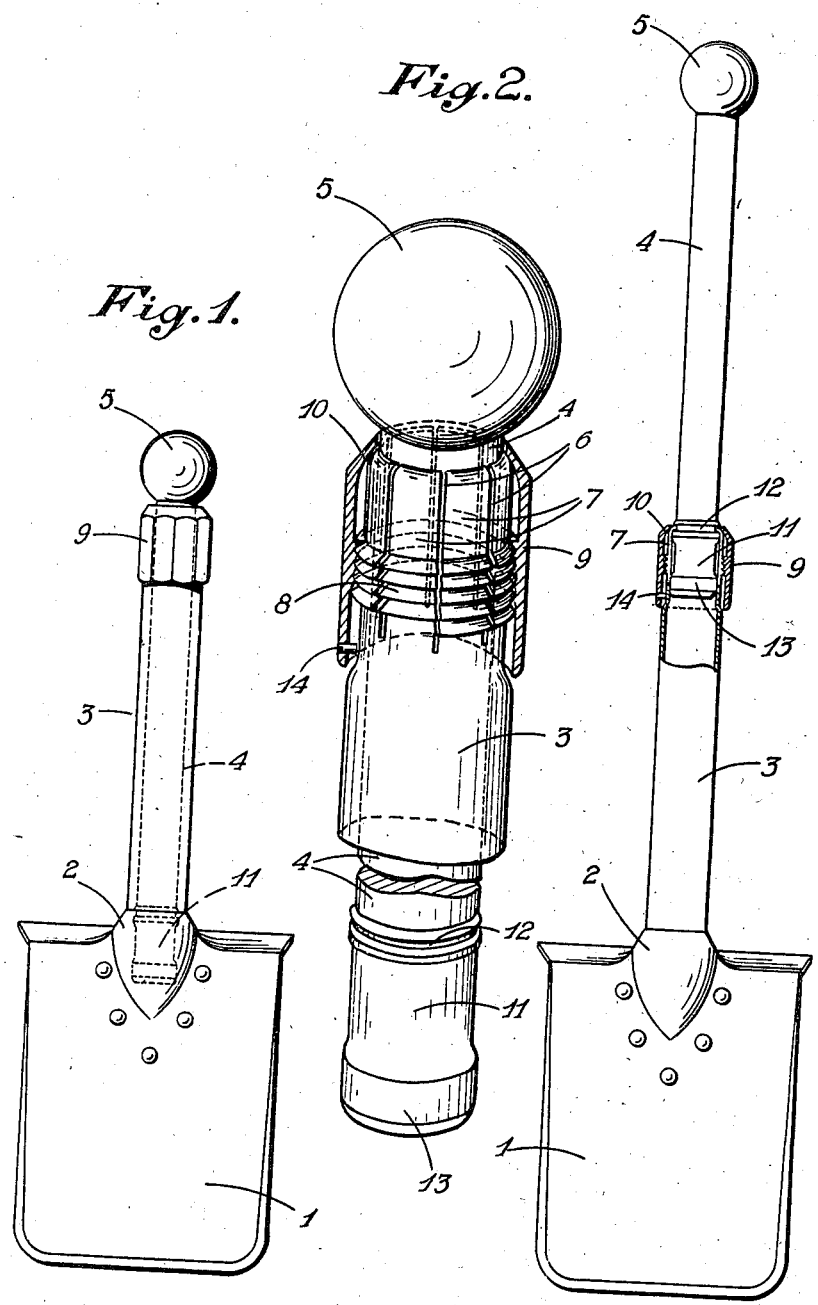

2,279,324

UNITED STATES PATENT OFFICE 2,279,324

SPADE OR SHOVEL

Joseph Julien, alias Eugène Pallen, Le Zoute, Belgium

Application May 13, 1940, Serial No. 335,011
In France May 12, 1939

4 Claims. (Cl. 294—57)

(Granted under the provisions of sec. 14, act of March 2, 1927; 357 O. G. 5)

This invention relates to spades or shovels which are particularly suitable for military use as entrenching tools, and comprise a telescopic or extensible handle adapted to be extended from the reduced length of a portable article to the full length of a normal spade or shovel.

It is an object of this invention to provide a handle in which a very firm and strong connection is afforded between the portions of the stem, and said portions can nevertheless be locked or unlocked in a very simple manner.

With this object in view I provide on one of the portions of the handle a ring of resilient claws, and means for simultaneously tightening said claws around the periphery of the other portion of the handle. Such tightening means preferably comprises a conical surface adapted to co-operate with a corresponding surface on the claws. The conical surface may be provided on an internally threaded ring or nut adapted to be screwed on a thread at or near the root of the claws, which are conveniently formed by making longitudinal slots in the end of the tubular or main portion of the handle.

The other portion forming the extension of the handle is preferably provided with a tip or end piece shaped to fit tightly between the claws and made with a groove in which the claws are adapted to engage when they are tightened by the nut. A very firm, yet easily detachable, connection is thus obtained between the two parts of the handle.

In the accompanying drawing, illustrating by way of example an embodiment of my invention:

Fig. 1 is an elevational view of the spade provided with a telescoped handle.

Fig. 2 is a view on a large scale, partly in perspective and partly in longitudinal section, of the fastening claws, nut and co-operating parts.

Fig. 3 illustrates the spade with extended handle; the fastening means being shown in longitudinal section.

In the drawing, 1 is the blade of a spade or shovel and 2 the steel socket formed with a tubular extension 3 which constitutes the main portion or stem of the extensible handle, while the telescoping portion 4 terminated by a ball 5 is slidably fitted in the tube 3.

The end of the tube 3 is divided by longitudinal slits 6 into a plurality of resilient claws 7 forming a ring and having an external screw thread 8. On this thread 8 is screwed a nut 9 having a conical outer edge 10 of smaller diameter than the ring of claws 7. The outer edge of the claws 7 are preferably bent inwardly so that when the nut 9 is screwed home the extension 4 of the handle is firmly clamped in the tubular stem 3.

The extension 4 may be of wood and it is provided, in the example described, with a metal tip 11 having a peripheral groove 12 and a ridge 13 proportioned to fit snugly in the ring of claws 7. Between the groove 12 and the ridge 13, the piece 11 is slightly constricted so that it will not interfere with the inward movement of the claws under the action of the nut 9.

When as shown in Fig. 1, the handle is telescoped and the nut 9 is tightened the wooden portion of the extension 4 is clamped between the claws 7. When it is desired to extend the handle, the nut is partly unscrewed, a pin 14 preventing the nut from being entirely freed. The claws 7 open owing to their resiliency and the extension 4 may then be pulled out of the tube 3 until the groove 12 in the metal tip 11 is engaged by the claws. The nut then is again screwed down and the conical surface 10 forces the claws 7 into firm engagement with the groove 12, while the ridge 13 cooperates with the claws in providing a rigid union between the stem 3 and the extension 4 (Fig. 3).

The construction as described is both simple and very strong. It will be understood, however, that it may be modified in its details without departing from the scope of the invention.

I claim:

1. A spade comprising, in combination, an extensible handle comprising a tubular portion and a stem portion adapted to be telescoped into said tubular portion, a blade secured to one end of said tubular portion, the other end of said tubular portion having a screw thread and terminating in a ring of resilient inwardly movable claws, a nut adapted to be screwed on said screw thread, said nut having an inner conical surface for engaging the claws and moving them inwardly against said stem portion, said stem portion having a ferrule at the end within the tubular portion, and said tubular portion having a socket at the base thereof and at the junction of the tube with the blade to receive said ferrule.

2. A spade comprising, in combination, an extensible handle comprising a tubular portion and a stem portion adapted to be telescoped into said tubular portion, a blade secured to one end of said tubular portion, a ring of resilient claws formed between longitudinal slits at the other end of said tubular portion, a ferrule at one end of said stem having a groove adapted to be engaged by said claws, a screw thread on the slit end of said tubular portion and a nut adapted to be screwed on said screw thread, said nut having an inner conical surface for engaging said claws and moving them into engagement with said grooved ferrule said ferrule having an annular ridge adjacent each end fitting closely against said claws leaving the intermediate portion of the ferrule with a slightly smaller diameter thus permitting freer movement of said claws.

3. A spade comprising, in combination, an extensible handle comprising a tubular portion and a stem portion adapted to be telescoped into said tubular portion, a blade secured to one end of said tubular portion, a ring of resilient claws formed between longitudinal slits at the other end of said tubular portion, a ferrule at one end of said stem portion, said ferrule having at one end a groove adapted to be engaged by said claws and at the other end a cylindrical ridge adapted to fit snugly in said ring of claws, a screw thread on the slit end of said tubular portion and a nut having an inner conical surface for engaging said claws and moving them into engagement with said groove.

4. A spade comprising, in combination, an extensible handle comprising a tubular portion and a stem portion adapted to be telescoped into said tubular portion, a blade secured to one end of said tubular portion, the other end of said tubular portion being constricted and terminating in a ring of resilient claws having inwardly curved tips, a screw thread on the constricted end of said tubular portion, a ferrule at one end of said stem portion, said ferrule having a groove adapted to be engaged by said resilient claws and a cylindrical ridge of greater diameter than said stem portion, said ridge being adapted to fit snugly in the constricted end of said tubular portion, and a nut engaging said screw thread, said nut having at one end an inner conical surface for engaging the tips of said claws and moving same inwardly into said groove.

JOSEPH JULIEN ALIAS EUGÈNE PALLEN.